United States Patent
Kneib et al.

(10) Patent No.: US 11,683,323 B2
(45) Date of Patent: Jun. 20, 2023

(54) METHOD AND DEVICE FOR AUTHENTICATING A MESSAGE TRANSMITTED VIA A BUS

(71) Applicant: Robert Bosch GmbH, Stuttgart (DE)

(72) Inventors: Marcel Kneib, Mainhardt (DE); Christopher Huth, Leonberg (DE); Jo Pletinckx, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 627 days.

(21) Appl. No.: 16/418,489

(22) Filed: May 21, 2019

(65) Prior Publication Data

US 2019/0364054 A1 Nov. 28, 2019

(30) Foreign Application Priority Data

May 23, 2018 (DE) .......................... 102018208118.2

(51) Int. Cl.
*H04L 9/40* (2022.01)

(52) U.S. Cl.
CPC ............ *H04L 63/123* (2013.01); *H04L 63/08* (2013.01)

(58) Field of Classification Search
CPC .................. H04L 63/123; H04L 63/08; H04L 2012/40215; H04L 12/40; H04L 63/0876; H04L 63/12; H04L 9/32; H04L 12/4013; H04L 2012/40273
See application file for complete search history.

(56) References Cited

U.S. PATENT DOCUMENTS

| | | | | |
|---|---|---|---|---|
| 5,012,442 A * | 4/1991 | McCambridge | ........ | H04L 12/40 714/48 |
| 6,118,745 A * | 9/2000 | Hutchins | ............ | G11B 20/1403 369/59.19 |
| 6,268,848 B1 * | 7/2001 | Eglit | ...................... | G09G 5/008 345/204 |
| 6,477,269 B1 * | 11/2002 | Brechner | ............ | G06F 16/5854 382/165 |
| 6,487,672 B1 * | 11/2002 | Byrne | .............. | G11B 20/10009 360/51 |
| 6,584,574 B1 * | 6/2003 | Embree | ................... | H03L 7/235 327/156 |
| 6,965,330 B1 * | 11/2005 | Fossum | .............. | H03H 17/0219 341/94 |
| 7,145,486 B1 * | 12/2006 | Chokhawala | ........... | H03M 9/00 341/100 |
| 7,286,126 B2 * | 10/2007 | Kim | ....................... | G09G 5/008 345/211 |

(Continued)

FOREIGN PATENT DOCUMENTS

DE    102014213752 A1    1/2016

*Primary Examiner* — Aravind K Moorthy
(74) *Attorney, Agent, or Firm* — Norton Rose Fulbright US LLP; Gerard Messina

(57) ABSTRACT

A method for authenticating a message transmitted via a communication channel, including the following: sampling recurring signal edges within a data frame of the message, sampling values being obtained with a start time that is offset between the signal edges, reconstructing an average signal characteristic of a part of the message from the sampling values, calculating signal-technical properties of the data frame from the signal characteristic, and the message is authenticated based on the properties.

13 Claims, 2 Drawing Sheets

(56) References Cited

U.S. PATENT DOCUMENTS

| | | | | |
|---|---|---|---|---|
| 7,327,296 | B1* | 2/2008 | Gaboriau | H03M 3/358 |
| | | | | 341/143 |
| 7,715,445 | B1* | 5/2010 | Rosselot | H04L 12/4013 |
| | | | | 370/518 |
| 9,367,495 | B1* | 6/2016 | Forbes | G06F 13/40 |
| 2003/0043139 | A1* | 3/2003 | Engler | G09G 3/3611 |
| | | | | 345/211 |
| 2003/0202772 | A1* | 10/2003 | Dow | G11B 27/11 |
| | | | | 386/248 |
| 2005/0149296 | A1* | 7/2005 | Sieracki | G06K 9/00523 |
| | | | | 702/189 |
| 2005/0201503 | A1* | 9/2005 | Denk | H04L 27/2017 |
| | | | | 375/355 |
| 2005/0275436 | A1* | 12/2005 | Shih | G09G 5/008 |
| | | | | 327/94 |
| 2006/0241916 | A1* | 10/2006 | Sieracki | G10L 15/02 |
| | | | | 702/19 |
| 2007/0159440 | A1* | 7/2007 | Kang | G09G 3/3685 |
| | | | | 345/99 |
| 2008/0014886 | A1* | 1/2008 | Lee | H04W 56/0085 |
| | | | | 455/187.1 |
| 2008/0219380 | A1* | 9/2008 | Payne | H04L 7/0008 |
| | | | | 375/308 |
| 2010/0008575 | A1* | 1/2010 | Ouyang | H04N 9/312 |
| | | | | 382/168 |
| 2010/0027719 | A1* | 2/2010 | Pahuja | H04L 27/10 |
| | | | | 375/340 |
| 2010/0317391 | A1* | 12/2010 | Mody | H04W 12/126 |
| | | | | 455/512 |
| 2011/0142174 | A1* | 6/2011 | Park | H04B 1/7183 |
| | | | | 375/340 |
| 2013/0063127 | A1* | 3/2013 | Rudkin | G01L 9/12 |
| | | | | 324/76.39 |
| 2013/0121467 | A1* | 5/2013 | Cresens | A61B 6/583 |
| | | | | 378/62 |
| 2014/0015529 | A1* | 1/2014 | Bottomley | G01R 33/485 |
| | | | | 324/309 |
| 2014/0015990 | A1* | 1/2014 | Liang | H04N 5/23203 |
| | | | | 348/211.99 |
| 2014/0219666 | A1* | 8/2014 | Tselniker | H04L 27/2331 |
| | | | | 398/208 |
| 2014/0280636 | A1* | 9/2014 | Fredriksson | H04L 65/1101 |
| | | | | 709/206 |
| 2014/0309943 | A1* | 10/2014 | Grundlehner | A61B 5/7264 |
| | | | | 702/19 |
| 2014/0328357 | A1* | 11/2014 | Fredriksson | H04L 12/4135 |
| | | | | 370/520 |
| 2014/0363164 | A1* | 12/2014 | Kim | H04B 10/2572 |
| | | | | 398/65 |
| 2015/0229859 | A1* | 8/2015 | Guidash | H04N 5/35554 |
| | | | | 348/308 |
| 2016/0036684 | A1* | 2/2016 | Jones | H03K 5/1534 |
| | | | | 370/252 |
| 2016/0218818 | A1* | 7/2016 | Lorenz | H04J 3/0697 |
| 2016/0231409 | A1* | 8/2016 | Taviani | G01R 33/4835 |
| 2016/0254821 | A1* | 9/2016 | Luo | H03M 1/125 |
| | | | | 341/161 |
| 2016/0380667 | A1* | 12/2016 | Chauhan | H04B 1/50 |
| | | | | 375/219 |
| 2017/0289931 | A1* | 10/2017 | Mendel | H04B 17/318 |
| 2018/0220466 | A1* | 8/2018 | Park | H04W 72/0446 |
| 2018/0247790 | A1* | 8/2018 | Li | H01J 37/244 |
| 2018/0316710 | A1* | 11/2018 | Fujiwara | H04W 12/122 |
| 2018/0327699 | A1* | 11/2018 | Ota | G01N 15/147 |
| 2018/0337766 | A1* | 11/2018 | Sturm | H04L 12/40 |
| 2019/0064962 | A1* | 2/2019 | Bye | G06F 3/041662 |
| 2019/0207742 | A1* | 7/2019 | Haroun | H04J 3/06 |
| 2020/0412528 | A1* | 12/2020 | Saint | H04L 9/085 |

* cited by examiner

METHOD AND DEVICE FOR AUTHENTICATING A MESSAGE TRANSMITTED VIA A BUS

RELATED APPLICATION INFORMATION

The present application claims priority to and the benefit of German patent application no. 10 2018 208 118.2, which was filed in Germany on May 23, 2018, the disclosure of which is incorporated herein by reference.

FIELD OF THE INVENTION

The present invention relates to a method for authenticating a message transmitted via a bus. The present invention also relates to a corresponding device, a corresponding computer program as well as a corresponding storage medium.

BACKGROUND INFORMATION

In IT security, an intrusion detection system (IDS) is any system for detecting attacks that are directed against a computer system or computer network.

Patent document DE 10 2014 213 752 A1 provides a computing device for detecting attacks on a technical system on the basis of events of a sequence of events. The computing device has a receiving unit for receiving the event sequence, which includes a plurality of events, an attack being determined by a specific sequence of events in the received event sequence, and a checking unit for checking the received event series based on a main event that is contained in the specific sequence of events, the checking unit being configured to perform a pattern detection in the received event sequence based on the specific sequence of events if the main event has occurred. The fact that the checking unit checks the received event sequence only for the occurrence of a main event and performs the more precise pattern detection only after the occurrence of the main event makes it possible to reduce the required computing expenditure.

SUMMARY OF THE INVENTION

The present invention provides a method for authenticating a message transmitted via a bus, a corresponding device, a corresponding computer program as well as a corresponding storage medium in accordance with the independent claims.

The approach provided is based on the recognition that the essence of known IDSs lies in monitoring the content and the periodicity of messages and in verifying whether significant changes occur in them. Since these features are predictable in vehicle networks either regularly or otherwise, such approaches may be justifiable in most cases. There are critical attacks, however, which existing IDSs are neither able to detect nor to prevent, and that is for two main reasons: First, messages inside vehicles normally do not contain information about their sender, which renders authentication difficult, and, second, the absence of the sender information makes it very difficult or impossible even for modern IDSs to identify which electronic control unit (ECU) performed an attack.

For this reason, the alternative approach of message authentication is pursued as a countermeasure against attacks on vehicle networks. Although this offers a certain measure of security and proves to be efficient for Internet security, its use in networks inside the vehicle—for example, by attaching a message authentication code (MAC)—has so far been rather tentative in light of the limited transmission capacity of messages inside the vehicle and of the exacting requirements regarding real-time processing and real-time communication.

In connection with an approach known in technical terminology as "fingerprinting" by contrast, received data frames are sampled at a high rate in order to be able to detect the properties of the signals or of the individual bits with precision. The sampling rate required for this purpose varies depending on the bus topology between 10 and 20 million samples per second. Experiments have shown that it is possible to achieve very good results if only individual bits of the data frame are taken into account, e.g., a bit having a rising edge and a bit having a falling edge. These two considered bits are then processed in that for example features such as average value or standard deviation are calculated and used for classifying the transmitter ECU. For this purpose, in turn, classical machine learning algorithms such as logistic regression or support vector machines (SVMs) are used. Considering individual bits generates fewer data, which substantially facilitates further processing.

The approach of the present invention is now based on the insight that there are multiple rising and falling edges in a CAN frame. These recurring signals may be used to lower the requirements with respect to the sampling rate of the analog-digital converter (ADC) required for sampling. For this purpose, each edge is sampled with a start time that is offset slightly with respect to the preceding edge.

An advantage of this approach is that it opens the possibility of implementing a substantially more favorable variant of CAN fingerprinting since an ADC may be used with a markedly lower sampling rate. The joint consideration of multiple bits additionally simplifies the processing of the measure values significantly so that no additional hardware is necessary for processing the data and the method may be implemented solely in software.

Apart from the reduced sampling rate, another advantage of this method is that the resulting bit corresponds to a kind of average value of all contained bits. To this extent, the bit produced in this manner is in its signal-technical properties representative for all considered bits of the entire data frame.

The measures indicated in the dependent claims allow for advantageous further developments and improvements of the basic idea indicated in the independent claim.

Exemplary embodiments of the present invention are illustrated in the drawings and are explained in greater detail in the following description.

DETAILED DESCRIPTION

Figure 1:
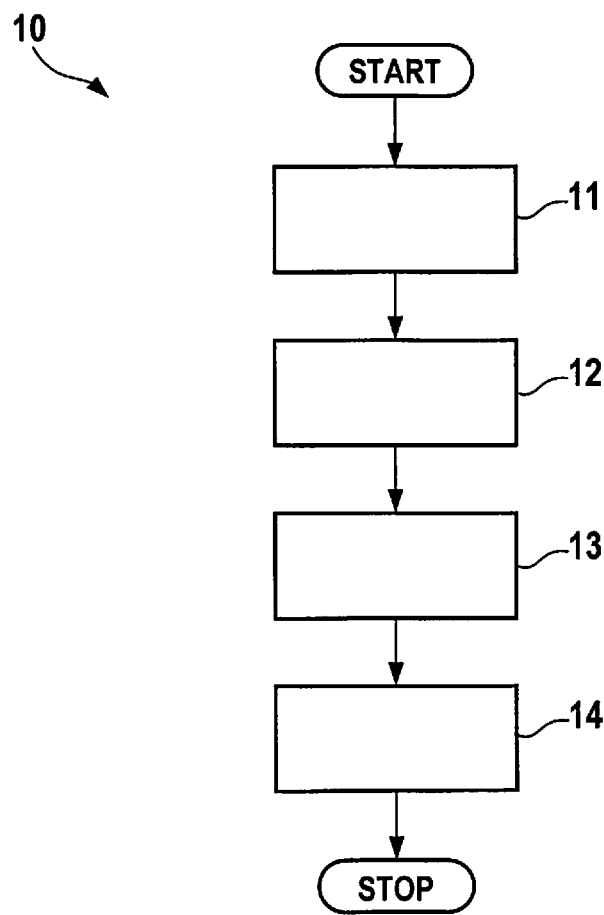
FIG. 1 shows a flow chart of a method according to a first specific embodiment.
Figure 2:
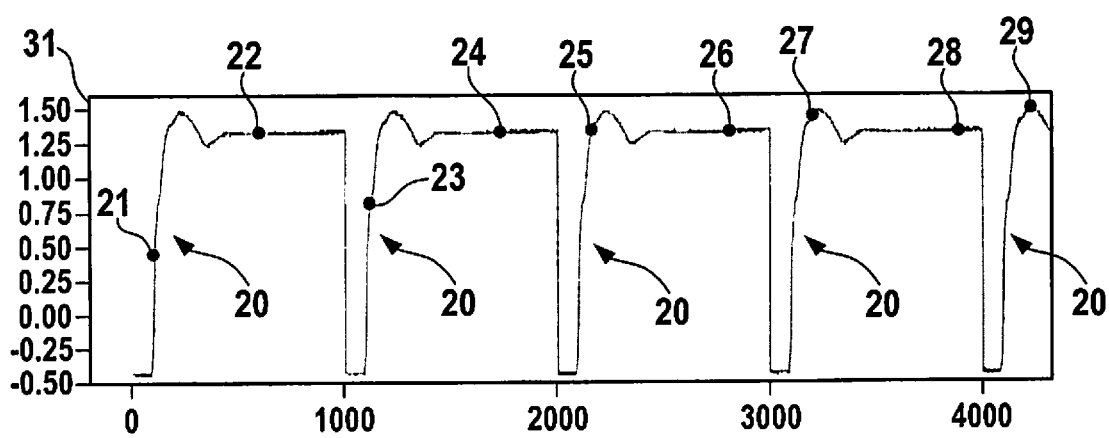
FIG. 2 shows an illustration of repeated sampling.

FIG. 1 illustrates the basic sequence of a method (10) according to the present invention, which shall now be explained with reference to the oscillogram of FIG. 2. Accordingly, recurring signal edges (20) within a data frame of the transmitted message are sampled, the sampling values (21-29) being obtained with a start time slightly offset between the signal edges (20) (process 11). The average signal characteristic (30) of a bit of the message is then reconstructed (process 12) from the sampling values (21-29). On the basis of the signal characteristic (30) in turn, it is possible to calculate signal-technical properties of the data frame (process 13), on the basis of which the message is ultimately authenticated or discarded (process 14).

Figure 3:
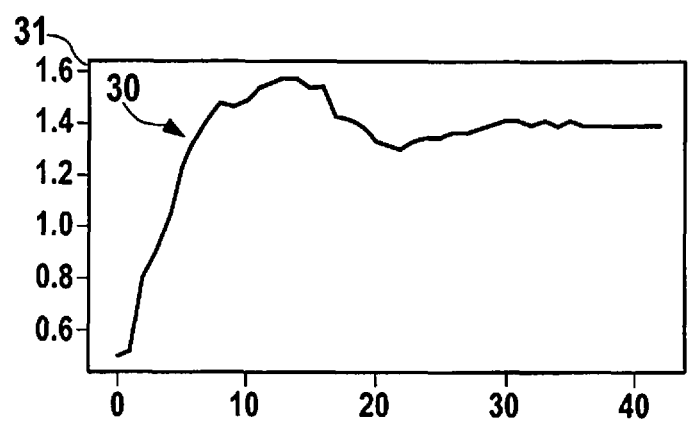
FIG. 3 shows a first composite bit.

If, for example, 40 measured values are required in order to allow for a sufficient classification, then it is possible, for example, instead of using an ADC at 20 MS/s at a symbol rate of 500,000 baud, to sample, in accordance with the method (10) described above, 20 signal edges (20) at a sampling rate of merely 1 MS/s. In this manner, each of the 20 considered bits is sampled twice with a rising signal edge (20). Sampling values (21-29) obtained in this way are eventually combined with one another in order to produce a complete bit that is made up of 40 measuring points from which the features can be calculated. Its signal characteristic (30) is shown in FIG. 3.

This method requires a very small number of rising or falling signal edges (20) in order to obtain the required sampling values (21-29). Unfortunately, it may happen that only very few usable signal edges (20) occur in a data frame, e.g., when greatly reduced payload data or mainly zeros are transmitted. In order to be able to use additionally the signal edges (20) possibly influenced by arbitration on the basis of the identifier (ID), it is possible to check, at a sampling rate of at least twice the baud rate with respect to the run time, whether they may be used for classification. For this purpose, the last sampling points of the possibly affected data frames are compared with the signal level (31) of the first uncritical bit. If there are significant differences, the affected bits are discarded and are otherwise used for classification.

Figure 4:
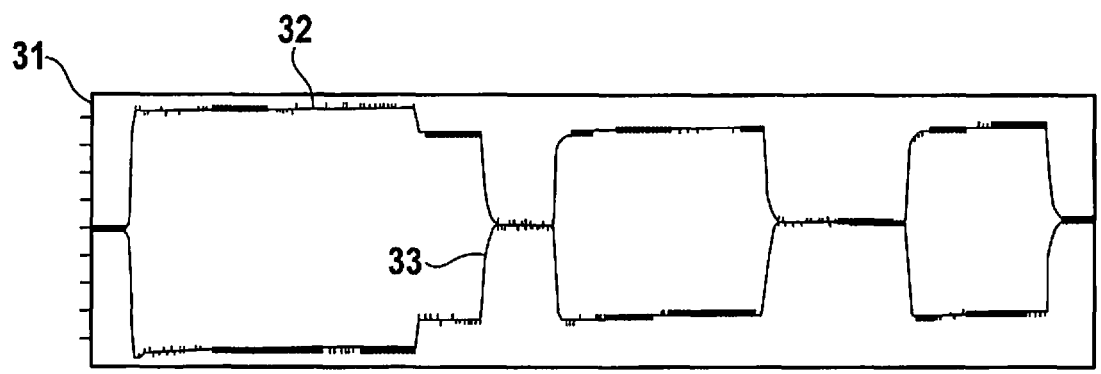
FIG. 4 shows a second composite bit.

An example for such differences in connection with arbitration is shown in FIG. 4. In order to be able to observe these differences, it is necessary in differential signal transmission, however, that the signal conductors—here for example CAN low (32) and CAN high (33)—are considered separately since the higher voltages otherwise equalize one another.

Figure 5:
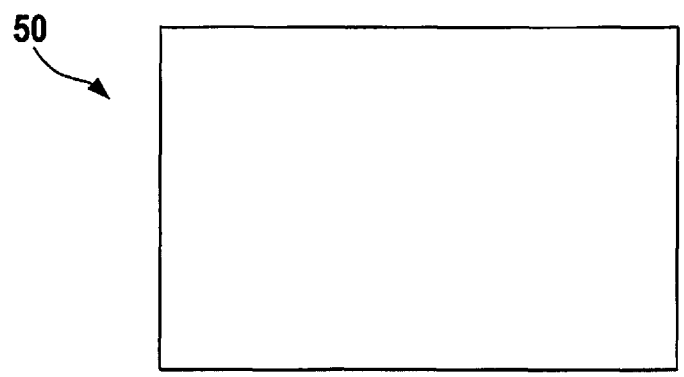
FIG. 5 shows a control unit according to a second specific embodiment in a schematic representation.

This method (10) may be implemented for example in software or hardware or in a mixed form of software and hardware for example in a control unit (50), as the schematic representation of FIG. 5 illustrates.

What is claimed is:

1. A method of a sampling and authenticating device including an analog-digital converter (ADC) and a processor communicatively coupled to the ADC for sampling electrical signals of a message from a communication channel on which the electrical signals are transmitted and for authenticating the message, the method comprising:
   sampling, by the ADC, recurring electrical signal edges within a data frame of the message, thereby obtaining respective sampling values, wherein the sampling is performed such that for each pair of immediately adjacent ones of the sampled electrical signal edges, a respective start time of the sampling of the respective electrical signal edge, relative to a start of the respective electrical signal edge, is offset between the electrical signal edges of the respective pair;
   the processor reconstructing an average signal characteristic of a part of the message from the sampling values sampled by the ADC;
   the processor determining signal-technical properties of the data frame from the average signal characteristic; and
   the processor authenticating the message based on the signal-technical properties.

2. The method of claim 1, further comprising:
   comparing the sampling values of one of the electrical signal edges with sampling values of another of the electrical signal edges; and
   discarding, for significant deviations determined to be a result of the comparing, those of the sampling values affected by an arbitration prior to the reconstructing of the average signal characteristic.

3. The method of claim 2, wherein the comparing is performed at a sampling rate that exceeds a baud rate of the communication channel.

4. The method of claim 2, wherein the message is transmitted as a difference of two voltage signals, and wherein at least one of the voltage signals is taken into account in the comparing.

5. The method of claim 1, wherein the communication channel is a CAN.

6. The method of claim 1, wherein the signal-technical properties include an average value or the signal-technical properties include a standard deviation.

7. The method of claim 1, wherein for the authenticating of the message, the signal-technical properties are classified by a support vector machine, or wherein for the authenticating of the message, the signal-technical properties are modeled by a logistic regression.

8. The method of claim 1, wherein the sampling values sampled by the ADC consist of two sampling values for each of the electrical signal edges.

9. The method of claim 1, wherein the sampling is performed at a rate of two sampling values per predefined unit of time at which a single symbol is obtained.

10. The method of claim 9, wherein the rate of the sampling is one million sampling values per second and the message is transmitted at a rate of 500,000 symbols per second.

11. A non-transitory computer readable medium having a computer program, which is executable by a processor of a sampling and authenticating device that includes an analog-digital converter (ADC) and the processor, which is communicatively coupled to the ADC, the computer program comprising program code that when executed by the processor, causes the processor to perform a method for sampling electrical signals of a message from a communication channel on which the electrical signals are transmitted and for authenticating the message transmitted via the communication channel, the method comprising:
   controlling the ADC to sample recurring electrical signal edges within a data frame of the message, thereby obtaining respective sampling values, wherein the sampling is performed such that for each pair of immediately adjacent ones of the sampled electrical signal edges, a respective start time of the sampling of the respective electrical signal edge, relative to a start of the respective electrical signal edge, is offset between the electrical signal edges of the respective pair;
   reconstructing an average signal characteristic of a part of the message from the sampling values sampled by the ADC;
   determining signal-technical properties of the data frame from the average signal characteristic; and
   authenticating the message based on the signal-technical properties.

12. The computer readable medium of claim 11, wherein the method further comprises:
  comparing the sampling values of one of the electrical signal edges with sampling values of another of the electrical signal edges; and
  discarding, for significant deviations determined to be a result of the comparing, those of the sampling values affected by an arbitration prior to the reconstructing of the average signal characteristic.

13. A sampling and authenticating device comprising:
  an analog-digital converter (ADC); and
  a processor communicatively coupled to the ADC;
  wherein the sampling and authenticating device is configured to sample electrical signals of a message from a communication channel on which the electrical signals are transmitted and to for authenticate the message by performing a method, the method comprising:
    sampling, by the ADC, recurring electrical signal edges within a data frame of the message, thereby obtaining respective sampling values, wherein the sampling is performed such that for each pair of immediately adjacent ones of the sampled electrical signal edges, a respective start time of the sampling of the respective electrical signal edge, relative to a start of the respective electrical signal edge, is offset between the electrical signal edges of the respective pair;
  the processor reconstructing an average signal characteristic of a part of the message from the sampling values sampled by the ADC;
  the processor determining signal-technical properties of the data frame from the average signal characteristic; and
  the processor authenticating the message based on the signal-technical properties.

* * * * *